(12) United States Patent
DeCurtis et al.

(10) Patent No.: US 11,166,142 B1
(45) Date of Patent: Nov. 2, 2021

(54) PROXIMITY PRIVACY ENGINE

(71) Applicant: DeCurtis Corporation, Orlando, FL (US)

(72) Inventors: David DeCurtis, Windermere, FL (US); Derek Fournier, Valrico, FL (US); Paul Schottland, Fort Mill, SC (US); Debashis Choudhury, Dallas, TX (US); James Learish, Cary, NC (US)

(73) Assignee: DeCurtis Corporation, Orlando, FL (US)

(*) Notice: Subject to any disclaimer, the term of this patent is extended or adjusted under 35 U.S.C. 154(b) by 0 days.

(21) Appl. No.: 16/928,569

(22) Filed: Jul. 14, 2020

(51) Int. Cl.
*H04W 4/80* (2018.01)
*H04W 40/24* (2009.01)
*H04W 4/021* (2018.01)

(52) U.S. Cl.
CPC ............. *H04W 4/80* (2018.02); *H04W 4/021* (2013.01); *H04W 40/244* (2013.01)

(58) Field of Classification Search
CPC .................................................. H04W 12/0027
See application file for complete search history.

(56) References Cited

U.S. PATENT DOCUMENTS

| | | | |
|---|---|---|---|
| 8,849,205 B2 | 9/2014 | Desai et al. | |
| 8,862,067 B2 | 10/2014 | Un et al. | |
| 9,357,342 B2 | 5/2016 | Viswanadham et al. | |
| 9,418,531 B2 | 8/2016 | Basalamah et al. | |
| 9,485,603 B2 | 11/2016 | Worrall et al. | |
| 9,774,985 B2 | 9/2017 | Weizman et al. | |
| 9,875,588 B2 | 1/2018 | McCollum et al. | |
| 10,037,642 B2 | 7/2018 | Padgett et al. | |
| 10,045,184 B2 | 8/2018 | Padgett et al. | |
| 10,049,516 B2 | 8/2018 | Padgett et al. | |
| 10,140,649 B2 | 11/2018 | Drake et al. | |
| 10,157,514 B2 | 12/2018 | Padgett et al. | |
| 10,171,978 B2 | 1/2019 | Padgett et al. | |
| 10,238,976 B2 | 3/2019 | Ackley et al. | |
| 10,304,271 B2 | 5/2019 | Padgett et al. | |
| 10,499,228 B2 | 12/2019 | Padgett et al. | |
| 2002/0119788 A1* | 8/2002 | Parupudi ............ | H04W 12/104 455/456.1 |
| 2003/0078053 A1* | 4/2003 | Abtin ................... | H04W 12/02 455/456.1 |
| 2004/0127229 A1* | 7/2004 | Ishii ...................... | H04W 4/02 455/456.1 |
| 2006/0293066 A1* | 12/2006 | Edge .................... | H04W 4/029 455/456.3 |
| 2008/0123683 A1* | 5/2008 | Cheng .................. | H04L 67/306 370/464 |
| 2014/0122148 A1 | 5/2014 | Padgett et al. | |

(Continued)

FOREIGN PATENT DOCUMENTS

EP 3046342 A1 7/2016

*Primary Examiner* — Ernest G Tacsik
(74) *Attorney, Agent, or Firm* — Freeborn & Peters

(57) ABSTRACT

Systems, methods, and computer-executable instructions for providing privacy to proximity data. A beacon identifier associated with a first object is received. Privacy data associated with the beacon identifier is determined. A filter determination of the beacon identifier based on the first privacy data is determined. An indication to filter the beacon identifier is provided. The beacon identifier is filtered, such that a running application is never aware of the detected beacon identifier.

20 Claims, 10 Drawing Sheets

(56) References Cited

U.S. PATENT DOCUMENTS

| | | |
|---|---|---|
| 2015/0140982 A1* | 5/2015 | Postrel .................... H04W 4/80 |
| | | 455/418 |
| 2016/0183042 A1 | 6/2016 | Weizman et al. |
| 2016/0217496 A1* | 7/2016 | Tuchman ............ G06Q 30/0269 |
| 2016/0225264 A1* | 8/2016 | Taveira ................ G08G 5/0013 |
| 2016/0373893 A1 | 12/2016 | Khanna et al. |
| 2017/0063953 A1* | 3/2017 | Niewczas ............... H04L 67/18 |
| 2018/0276434 A1 | 1/2018 | Li et al. |
| 2020/0059774 A1 | 2/2020 | Padgett et al. |

* cited by examiner

PROXIMITY PRIVACY ENGINE

BACKGROUND

Location services, that incorporate data from positioning systems or proximity systems, gather location data of a number of objects. For example, data from iBeacon or Eddystone beacons and readers can be used to determine the position of the beacons. As individuals may carry a beacon, the locations of these individuals may be made available via a location service. Unfettered access to the location data of individuals raises a multitude of privacy concerns.

DETAILED DESCRIPTION

Figure 1:
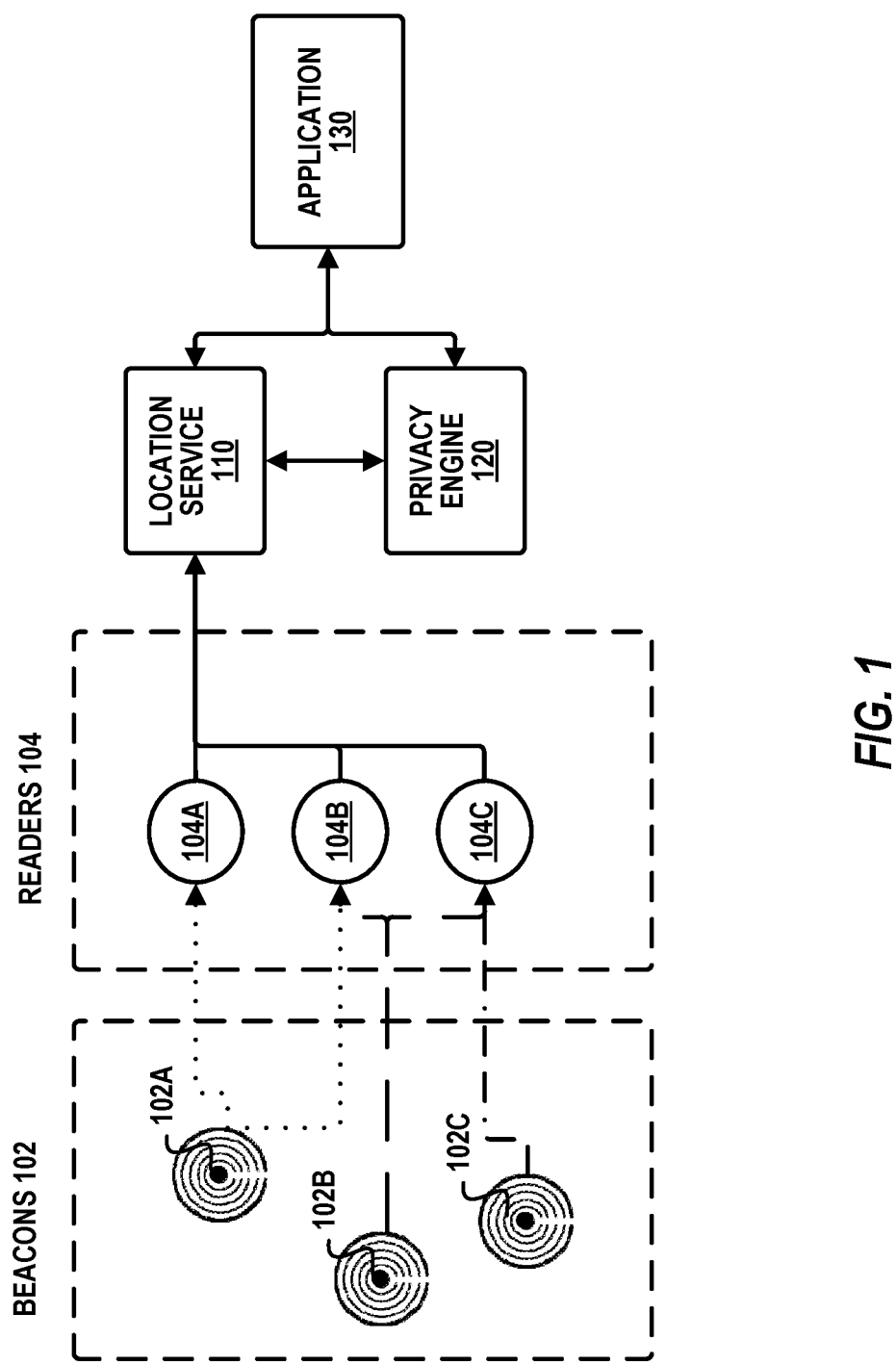
FIG. 1 is a system diagram of a privacy engine system in accordance with respective examples.

As location and proximity systems have become more prevalent in various areas, such as hotels, hospitals, cruise ships, etc., the need to provide privacy protection to the collected location data has become important. As disclosed herein, a privacy engine allows applications to access location data while providing access control and privacy to the location data.

Different applications may have different requirements for accessing location data. For example, a safety application may need more access to location data compared to a greeter application used by staff to know who is near them. In addition, access to location data may depend on where an object is located. The location of the user of an application may also be used to determine how much location data should be protected. Further, individuals may also want to control access to their own location data or family members' location data. In various embodiments, a privacy engine provides controls allowing applications flexible access to location data while providing a level of privacy.

In various embodiments, a privacy engine protects proximity location data. In some embodiments, the privacy engine protects proximity location data based on additional data from a location system. In a location system, readers are installed at locations within an area. In some installations, a number of the readers are installed at known locations. The readers installed at known locations allow a location system to determine where a beacon is located. In some installations thousands of readers may be deployed. The area may be an indoor location, such as a hotel, hospital, cruise ship, etc. A beacon may be carried by individuals or attached to objects. A beacon may be a Bluetooth device that broadcasts a beacon identifier than may uniquely identify the beacon. As an individual moves through the area their beacon broadcasts its beacon identifier which is received by one or more readers. The readers may then provide the detected beacon identifier to a central server. The central server may then determine a location of the individual within the area. For example, the individual's location may be determined via triangulation. In some embodiments, a privacy engine determines if an individual's location may be accessed. For example, the privacy engine may receive a request for an individual's location via an application. As described below, the privacy engine determines how much location information may be accessed by the application.

Mobile devices, such as a cell phone, tablet, laptop, etc., may also integrate a reader that is able to detect proximate beacons. Applications running on mobile devices may use a privacy engine to determine which beacons are nearby and not private, e.g., knowable. In various embodiments, the privacy engine filters received beacon identifiers from the application. Applications, in these embodiments, only see beacon identifiers that the privacy engine determines may be seen. For an example, a mobile device may receive two beacon identifiers. A privacy engine, which may be running locally or remotely, may determine that one individual is in a private area. The privacy engine filters the beacon identifier of the individual in the private area, such that the application never learns of the detected beacon identifier. This feature allows the proximity privacy of an individual location to be incorporated into the device rather than separately into each application.

In various embodiments, privacy of location data of objects may also be protected without detecting beacons. For example, a find-a-guest application may be used to locate an individual within a hotel. In this example, the find-a-guest application works without having to first detect a beacon identifier associated with the individual. Rather, an object identifier associated with an individual, separate from any beacon identifier, may be used to query for the individual's location. An object identifier may be associated with one or more beacon identifiers and identifies an object whose location may be tracked. Examples of objects include individuals, equipment, luggage, etc.

A privacy engine may use various data to determine a location value to provide to the requesting application. Data used to determine the location may include time, a time frame, a date range, the individual's location, a device's location, etc. The location value may include a specific position within an area; a specific room within the area; a floor of the area; unavailable; or unknown. When used for providing proximity privacy, the location value may be a binary value indicating that a detected beacon is knowable to an application or private.

FIG. 1 is a system diagram of a privacy engine system in accordance with respective examples. The system includes beacons 102 and beacon readers 104 that are part of a proximity system that provides proximity information to a location service 110. Beacons 102A, 102B, 102C may be carried by individuals or attached to objects such as luggage, equipment, etc. The beacons 102A, 102B, 102C advertise their presences by broadcasting beacon information to readers 104A, 104B, 104C. The beacon information may be continuously broadcast from the beacons 102A, 102B, 102C. The beacon information may include a beacon identifier and a transmission strength. The readers 104A, 104B, 104C detect the beacon information from one or more of the beacons 102A, 102B, 102C. Individually, the readers 102A, 102B, 102C are able to determine a distance between the reader and the detected beacon. The reader, however, is not able to determine a position of the beacon. Accordingly, the reader is able to detect advertised beacon information from beacons that are in the proximity of the readers.

Beacon information, or a portion of beacon information, along with potentially the proximate distance between a reader and a beacon may be sent to a location service 110. The location service 110 is able to use beacon information related to the same beacon, e.g., 102B, from multiple readers, e.g., 104B and 104C, to calculate a position or location of the beacon. For example, the location service 110 may use triangulation based on beacon information from three or more different readers. The location service 110, therefore, is able to determine a position of the beacon 102A. The position may be used to derive additional location information. In various examples, the location service 110 may provide location information to an application 130. The location service 110 may include a location engine that may be used to determine a position of a detected beacon.

The application 130, however, may interact with a privacy engine 120 to determine what location information is available to the application 130. In an example, the application 130 may request the location of an object, such as a guest on a cruise ship; a piece of luggage; a piece of equipment; a doctor; etc. from the privacy engine 120. The privacy engine 120 determines if the application 130 has access to the location information. In one example, the privacy engine 120 provides the requested location information that may be derived based on data from the location service 110. For example, the privacy engine may return the coordinate of the object; an indication of the area where the object is located; a floor or level where the object is located; or an indication that the object's location is not accessible. The privacy engine 120 may use various information to determine the location information. For example, a guest's personal preferences may be used. The application 130 may also be identified as a security or safety application, which has greater access to location data compared to a non-safety application.

The privacy engine 120 may also be used, without the location service 110, to determine which beacons the application 130 is able to learn are proximate to the application 130. For example, the privacy engine 120 may return a knowable or unknowable value, which indicates that the beacon may be known by the application 130 or should be filtered from the application 130. If the proximity value is unknowable, then the application 130 is unaware that the filtered beacon was detected. In other words, the application 130 is not aware that the beacon is proximate to the device on which the application is running. Specific examples of these different types of applications and uses of the privacy engine 120 are provided below.

Figure 2:
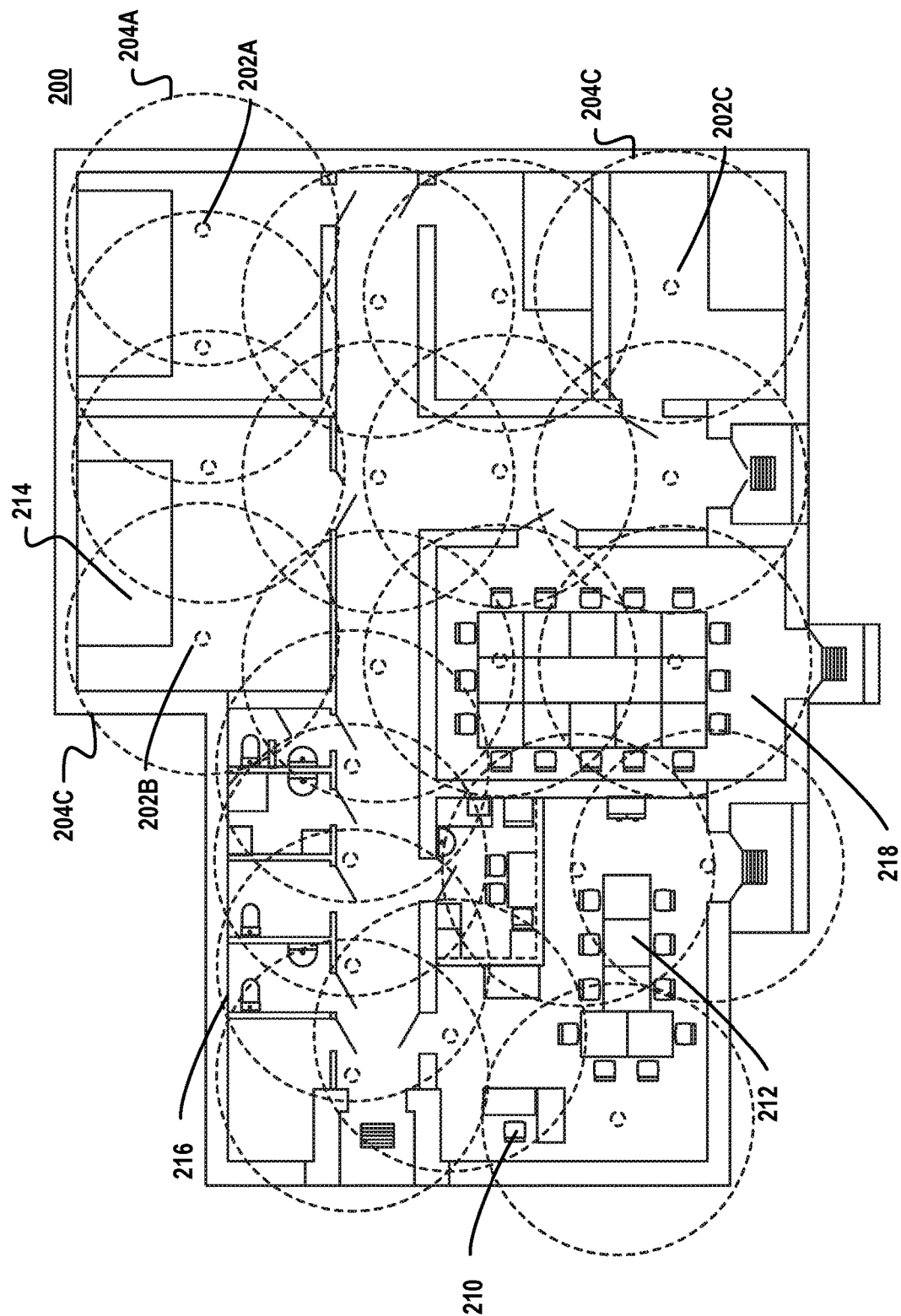
FIG. 2 is a diagram illustrating a proximity system covering an area in accordance with respective examples.

FIG. 2 is a diagram illustrating a proximity system covering an area 200 in accordance with respective examples. The area 200 may be an area within a hotel; a hospital; a commercial building; a cruise ship; etc. A number of readers 202A, 202B, 202C, etc., are placed within the area 200. The readers may be installed at fixed-known locations. Each reader has a corresponding range 204A, 204B, 204C, etc. Beacons that are located within these ranges may be detected by the readers. In various implementations, the ranges of readers overlap such that multiple readers detect the same advertised beacon. Using the detection by multiple readers, the location of the beacon within the area 200 may be determined.

The area 200 may be represented digitally, via a physical construct of the area. The physical construct describes the physical layout of the area 200. For example, the physical construct identifies boundaries, such as physical walls and virtual boundaries, in the area 200. A virtual boundary may be used to identify a subarea within a portion the area 200 that is not physically separated from other areas. For example, a reception area 210 may be identified as an area separate from a meeting area 212, even though there are no physical boundaries between the reception area 210 and the meeting area 212. Other subareas may be identified in the physical construct, such as a room 214, a bathroom 216, conference room 218, etc.

The readers 202A, 202B, 202C, etc., may provide beacon information to a location service (not shown). The location service may determine a location of the beacon based on the beacon information received from multiple readers. Using the determined location, the location service may determine a coordinate of the beacon within the area 200. The coordinate may be an x,y coordinate or an x,y,z coordinate. In some examples, the location service may determine an area that a beacon is located. For example, the beacon may be determined to be in the reception area 210. In these examples, the location service may return just an indication of the area, a coordinate, or both. The location service may also provide a more general location, such as first floor, front of the building, etc., rather than a more limitedly defined area. In some examples, all location information may be provided.

Figure 3:
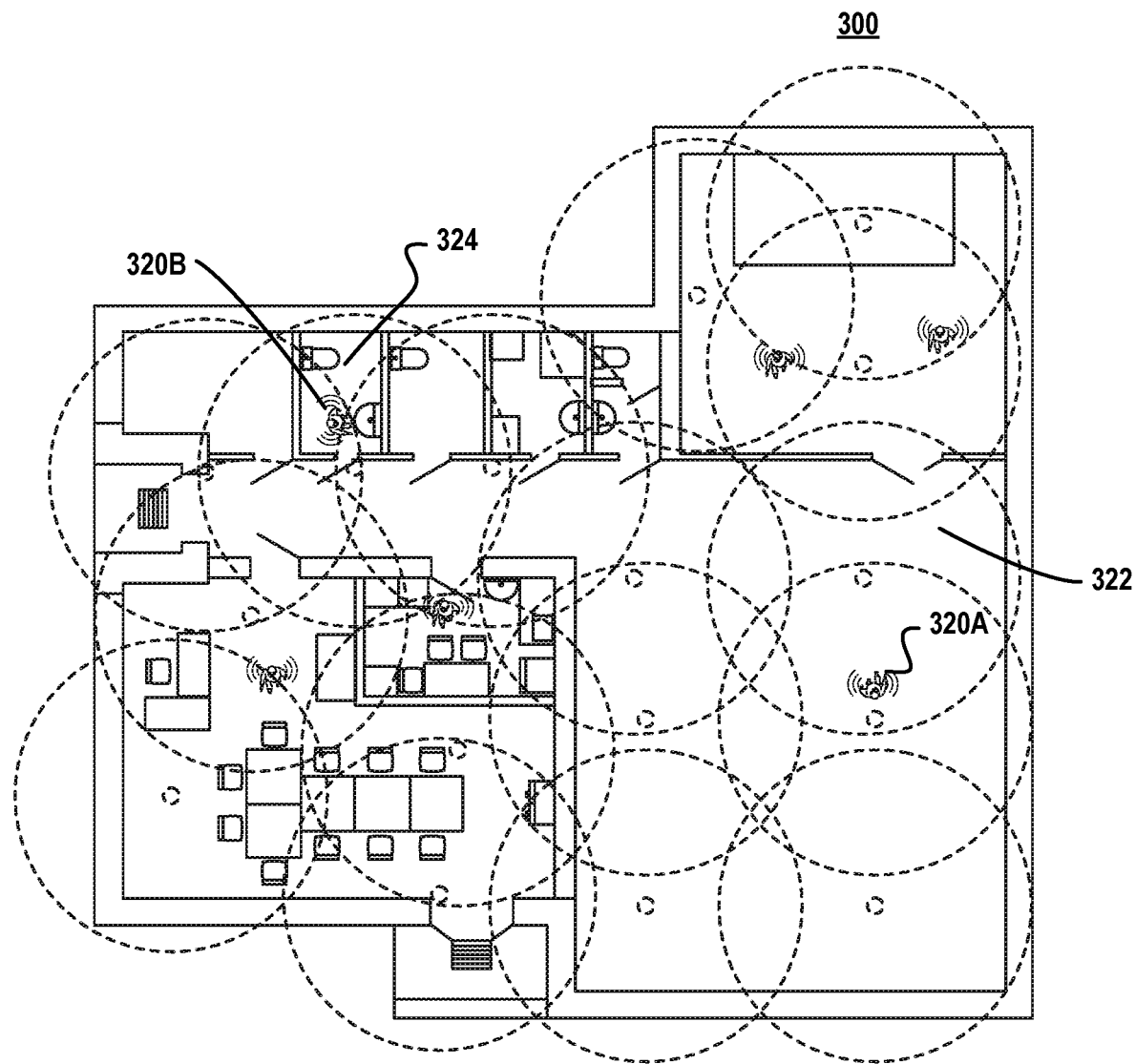
FIG. 3 is a diagram illustrating a proximity system covering a smaller portion of an area in accordance with respective examples.

FIG. 3 is a diagram illustrating a proximity system covering a smaller portion of an area 300 in accordance with respective examples. Individuals 320A, 320B, etc., move through the area 300. These individuals wear or hold a beacon that transmits a beacon identifier. The beacon identifiers may be read by one or more readers 302A, 302B, etc. The readers 302A, 302B, etc., may provide the beacon identifiers to a location service, not shown. The location service may use the detection of the beacon identifier from multiple readers to determine a location of the beacon within the area 300. The location may be a coordinate within a physical construct of the area 300. In addition, the location may be a room within the area 300. For example, the physical construct may include boundaries of rooms within the area 300. In various embodiments, the coordinate of the beacon is used to determine a room within the area 300 where the beacon is located. As an example, a beacon associated with the individual 320A may be determined to be in a public lounge space 322. The beacon associated with individual 320B may be determined to be in a bathroom 324.

A privacy engine may be used to determine what location information may be provided to a requesting application. In various embodiments, the privacy engine uses the determined location of the beacon within the physical construct to determine what location information to provide to an application. As an example, an application can be used to request the location of an individual or object within the area. The location of the device running the application may be distant from the location of the individual or object. This is referred to as location-based privacy. For example, a guest lookup application may be used by crew of a cruise ship or staff of a hotel to determine a location of a guest. The staff may request the location of individual 320A. In various embodiments, the privacy engine determines the beacon associated with individual 320A is in a public space. Based on determining the individual 320A is in a public space, the privacy engine may provide the coordinate of the individual, an indication of the lounge space where the individual is, or both. As another example, the staff may request the location of the individual 320B. The privacy engine may determine the individual 320B is in a private space. In this example, the privacy engine may return a location unknown or location private indication. The privacy engine may also provide a more general location, such as on the third flood but not indicate the specific space or coordinate of the individual.

Figure 4:
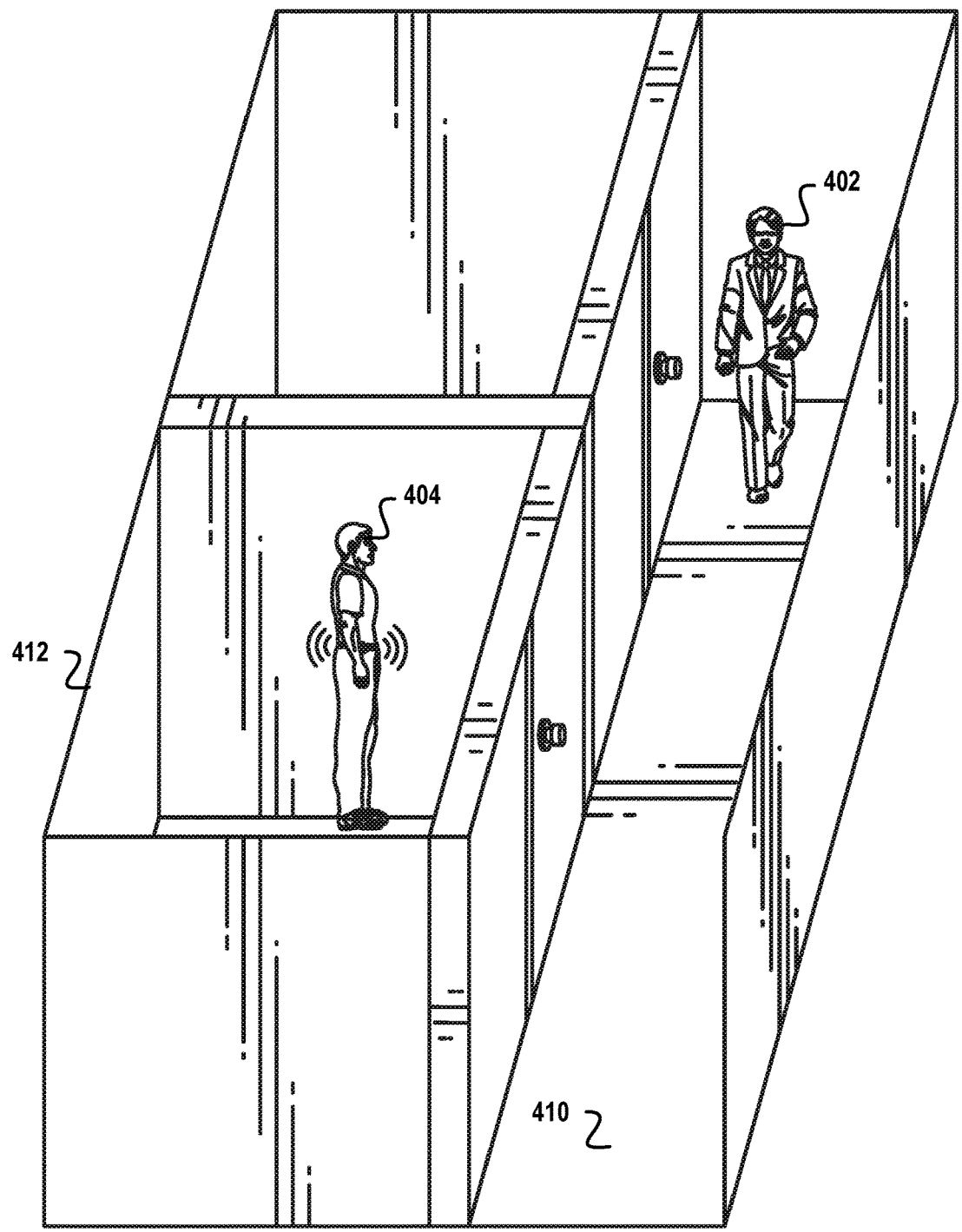
FIG. 4 is a diagram illustrating an application using a privacy engine in regard to proximity in an area in accordance with respective examples.

The privacy engine may also provide proximity based privacy. FIG. 4 is a diagram illustrating an application using a privacy engine in regard to proximity in an area in accordance with respective examples. Proximity based privacy is based on detecting a nearby beacon. FIG. 4 shows an area 400 that includes an individual 402 walking in a hallway 410. For example, the area 400 may be a portion of a hotel floor with a public hallway 410 and private rooms, such as room 412. The individual 402 may have a portable beacon reader that is able to detect a beacon from an individual 404 that is located in a room 412. As the individual 402 walks by the room 412, the portable beacon reader may detect the beacon associated with the individual 404.

As a specific example, the individual 402 may have a device that includes a beacon reader and is running a greeter application. The greeter application is used to detect nearby beacons, look up guest information associated with detected beacons and provide basic information on the detected guest. For example, the guest's name and picture may be accessed, thereby, allowing a staff member to greet a guest by name. In this example, the greeter application does not need guest information of guests that are in a private area, such as their room. As the individual 402 walks by the room 412, the beacon associated with the individual 402 is detected by the reader. A privacy layer, which may be part of the reader software, between the reader software and the application, or integrated into the application is used to determine if the individual's beacon should be accessible by the greeter application.

In an example, the location service knows the location of the individual 404 to be within the individual's room 412. Based on the individual 404 being in their own room 412, the privacy layer can filter the detected beacon associated with the individual 404 from the greeter application. This may be done by the privacy layer on the device requesting from the privacy engine if the detected beacon may be known to an application. The privacy engine may provide a binary response, e.g, yes or no. If the response is yes, the privacy layer may provide the detected beacon to the application, otherwise, the privacy layer filters the detected beacon. When a beacon is filtered, the running application is not provided with an indication that the beacon was detected. If the individual 404 was to move into the hallway 410, the privacy engine may use the individual's location being in a public area and allow the application to learn of the detected beacon. The application could then use the detected beacon to access relevant guest information.

Figure 5:
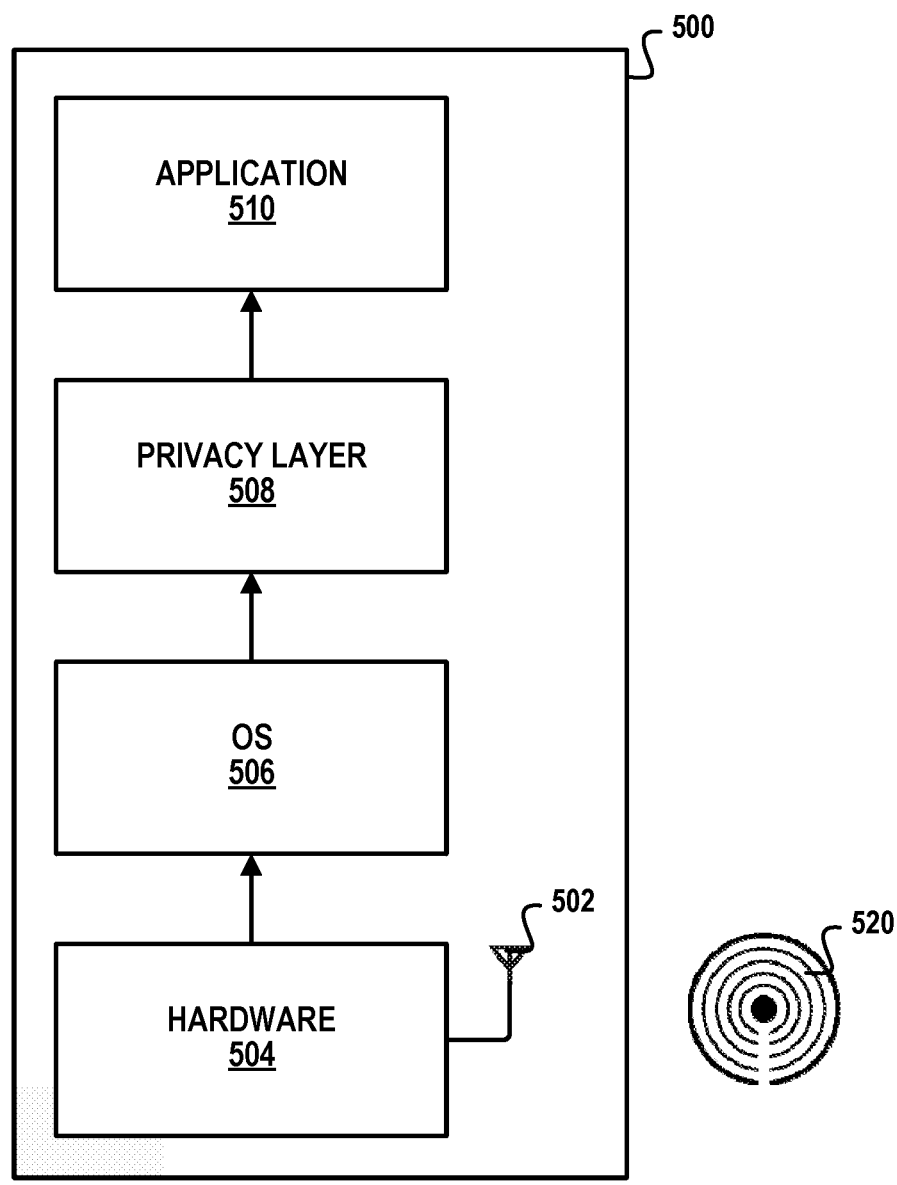
FIG. 5 is a block diagram of system for providing data protection in accordance with respective examples.

FIG. 5 is a block diagram of system for providing data protection in accordance with respective examples. FIG. 5 shows a device 500 that includes an application 510, such as a greeter application. The device 500 includes an antenna 502 and associated hardware 504 that is used to detect a broadcast beacon 520. The hardware 504 may be controlled, initialized, accessed, etc., by an operating system 506. Between the application 510 and the operating system 506 there may be a privacy layer 508. The privacy layer 508 may include a local privacy engine, access a remote privacy engine, or a combination of both. In one example, the privacy layer 508 uses a local privacy engine that relies only on data local to the device 520 to determine if and what location data may be shared with the application 510. In another example, the privacy layer 508 accesses a remote data store or a remote privacy engine to determine if and what location data may be shared with the application 510.

Figure 6:
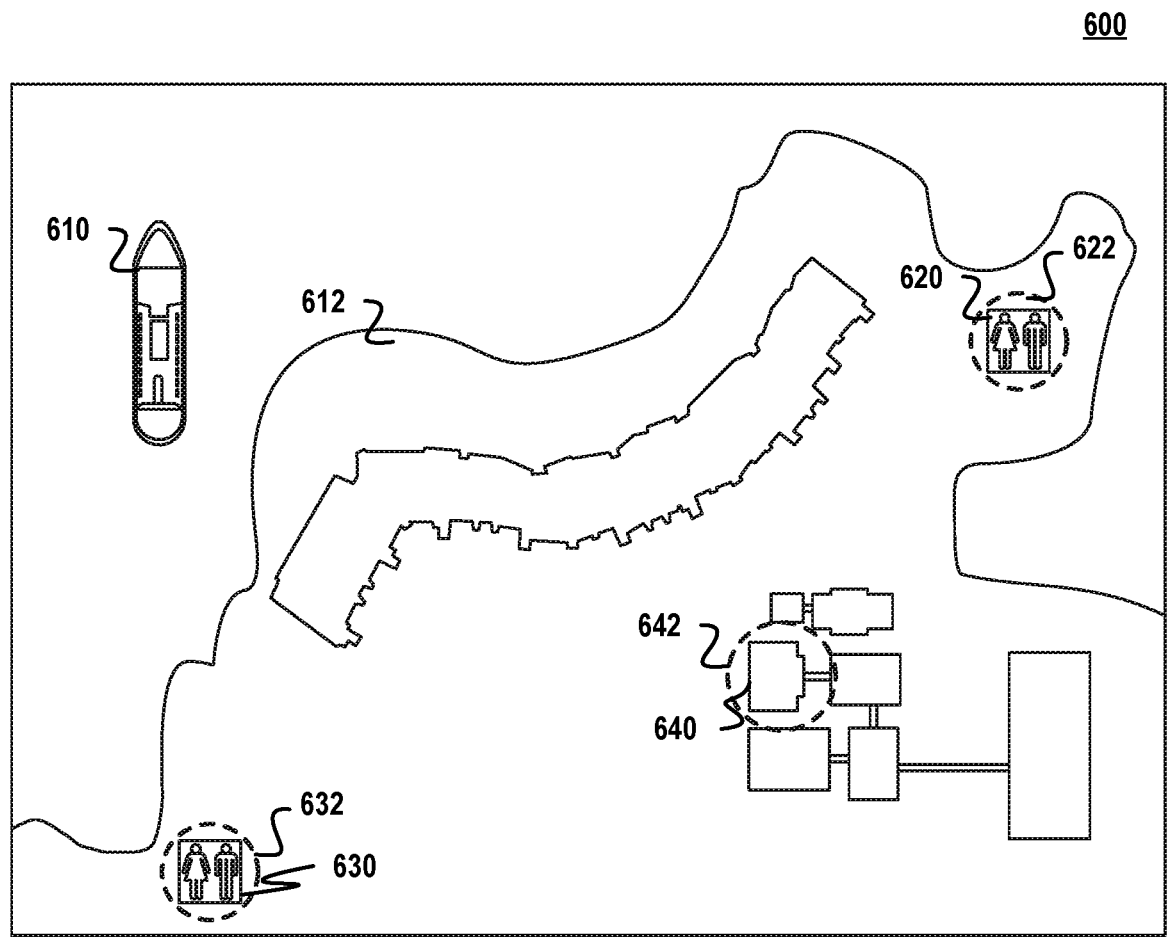
FIG. 6 is a diagram illustrating an application using a privacy engine in regard to location in an area in accordance with respective examples.

FIG. 6 is a diagram illustrating an application using a privacy engine in regard to location in an area 600 in accordance with respective examples. In various embodiments, FIG. 6 illustrates the use a privacy engine that is local to a device. In these examples, the privacy engine may operate on a device that does not have a data connection to a remote server. For example, a cruise ship 610 may dock at a location and guests may disembark to visit a beach 612. Areas on or near the beach 612 are known to be private. For example, restrooms 620 and 630 and a medical office 640 are known to be private areas.

The privacy engine may include data that represents these private areas. For example, a coordinate of each area along with a private radius may be stored on a device that includes the privacy engine. As another example, coordinates that mark the boundaries of the private areas may be stored. In FIG. 6, privacy halos 622, 632, and 642, are used to demark the private areas. In an example, the halos 622, 632, and 642, are large enough that beacons that are transmitting in the areas are not detectable outside of the halos. As a user of a device moves around the area 600, the device detects beacons. If the privacy engine determines the device is within any halo, all detected beacons are filtered. This preserves the privacy of individuals within any of the private areas 620, 630 and 640.

The privacy engine may also use additional information to filter detected beacons when the device is outside of the haloes 622, 632, or 642. For example, individual privacy settings may be used to filter detected beacons. As describe in other examples, individual privacy settings may include dates, times, requesting individual, application type, etc., to determine if a detected beacon should be filtered. The additional information may be stored locally on the device. In another example, the additional information may be stored on a remote server and accessed using a data connection of the device.

Figure 7:
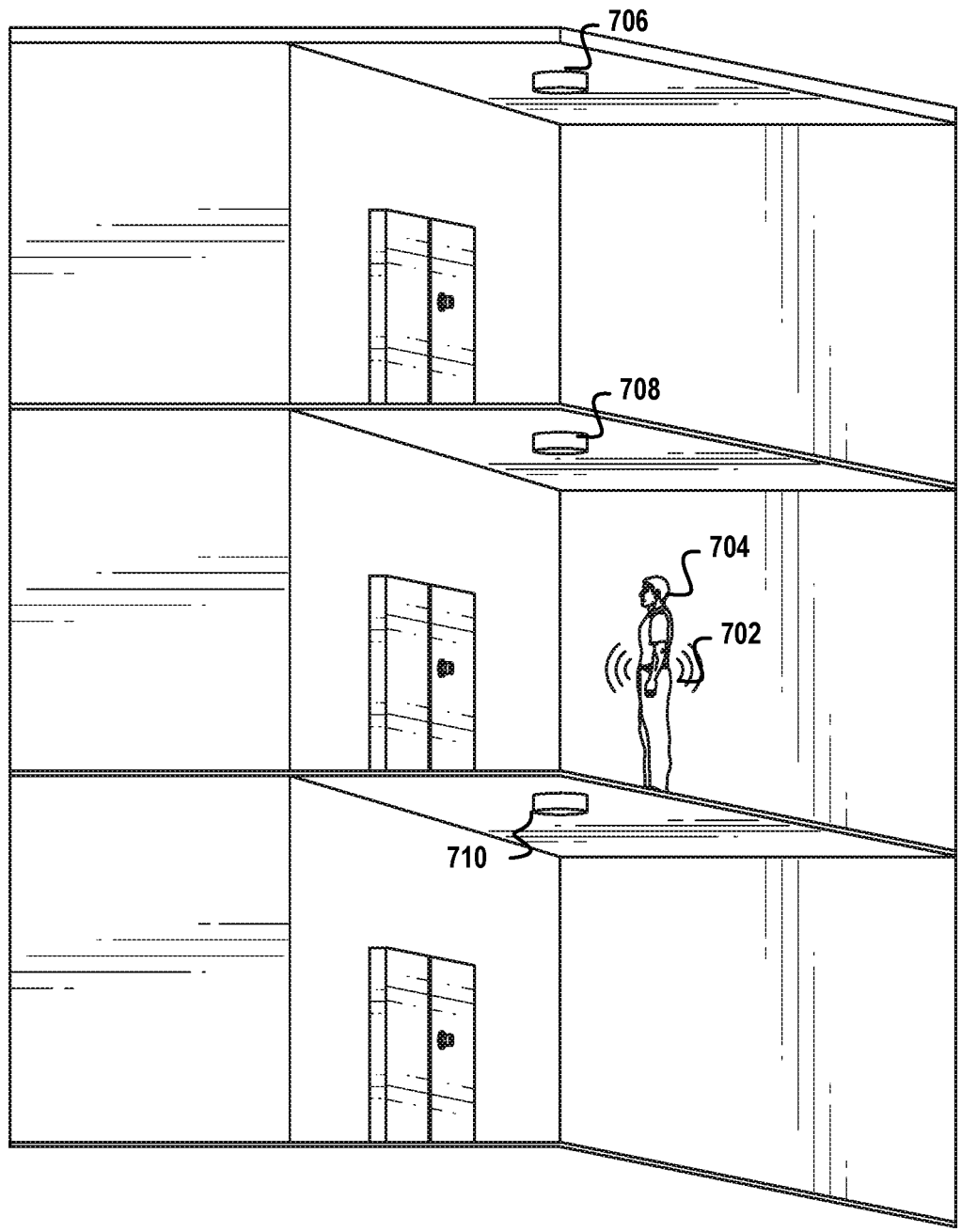
FIG. 7 is a diagram illustrating an application using a privacy engine in regard to location in a multi-floor area in accordance with respective examples.

FIG. 7 is a diagram illustrating an application using a privacy engine in regard to location in a multi-floor area 700 in accordance with respective examples. In various examples, a privacy engine may provide a location indication of a beacon that provides some information but not enough information to identify the exact location of the beacon. For example, a beacon 702 worn by and associated with an individual 704 may be detected by multiple readers 706, 708 and 710, as well as other readers not shown in FIG. 7. These detections may be relayed to a location service that calculates the location of the individual 704 to a specific coordinate within the area 700. An application may ask the location engine to provide the location of the beacon 702. Due to privacy settings associated with the individual 704, the specific coordinate of the individual 704 should not be returned to the application. In addition, providing an indication of the specific room where the individual 704 is located should also not be returned. In this example, a location indication such as the second floor may be returned. This location indication provides some location information but at a higher level of abstraction compared to the coordinate or specific room location.

Figure 8:
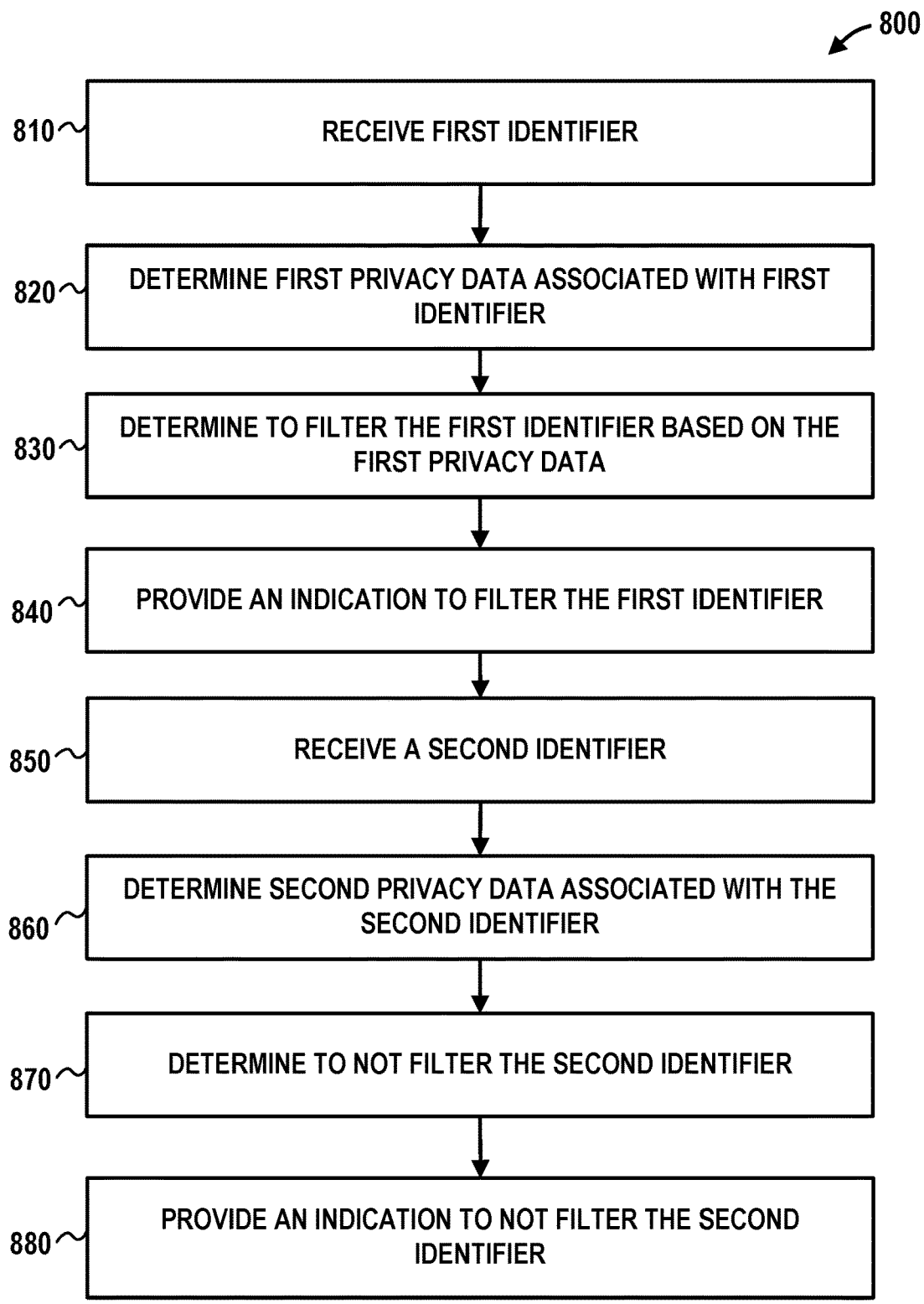
FIG. 8 is a flow diagram of a process for providing proximity data protection in accordance with respective examples.

FIG. 8 is a flow diagram of a process 800 for providing proximity data protection in accordance with respective examples. The process 800 may be executed on a computing device. The process 800 is used for providing privacy to proximate location data. For example, a reader on a device detects a beacon is nearby. The process 800 is used to determine if an application running on the device should learn that the beacon was detected. If the beacon is determined to be private, then the application is never aware that the beacon was detected by the device. Accordingly, the application never becomes aware that the beacon was proximate to the device.

At 810, a first beacon identifier associated with a first object is received. For example, a location engine or a privacy engine may receive the first beacon identifier. The beacon identifier may be associated with an individual, a crew member, a staff member, a piece of luggage, a piece of equipment, etc. The first beacon identifier may be derived from or part of beacon information that is broadcast from a beacon. The beacon may be worn or attached to the object. In an example, the beacon broadcasts beacon information over Bluetooth low energy (BLE) using the iBeacon or Eddystone protocols. The beacon information may include a beacon identifier that identifies the beacon.

The privacy engine or the location engine may use the beacon identifier to determine the object associated with the beacon identifier. For example, the beacon identifier may be used to determine an object identifier. The object identifier may be associated with multiple beacon identifiers. In this way, multiple beacon identifiers may be associated with the same object. Using an object identifier allows for continuance of location based services, such as the services provided or supported by the location engine and privacy engine, when an individual loses an initial beacon. If the individual loses this initial beacon, a new beacon with a new identifier may be given and associated with the object identifier. In this way, all services such as the privacy engine and the location engine may continue to operate continuously and consistently for the individual. In some examples, an object is configured to be untrackable. In this example, the location of the object is not determined or stored in the location engine. In another example, the location of the object is stored by the location engine but is not provided or accessible to any application via the privacy engine.

In various examples, objects that have an associated beacon move about a defined space. The defined space may be a hotel, a cruise ship, a hospital, a casino, etc. The defined space may have an associated physical construct that includes a definition of the space along with identified areas within the space. For example, the physical space may be mapped into the physical construct. The physical construct may include various defined spaces. The defined spaces may be defined using coordinate within the physical construct. The physical construct may be a two-dimensional or three-dimensional model. The locations of beacon readers may also be stored in the physical construct and used to determine a location of a beacon that is detected from multiple readers. The location of the beacon within the physical construct may be represented as an (x,y) or an (x,y,z) coordinate. In addition, the location of the beacon may also be associated with one or more defined spaces. These defined spaces may be provided to applications. For example, the location information of an object may include one or more of: a coordinate within the physical construct; a room associated with the coordinate; a floor associated with the coordinate; a portion of the floor associated with the coordinate; etc. As a specific example, the location information for an object may include the beacon is in the main conference room; in the north-east portion of the $30^{th}$ floor; on the $30^{th}$ floor; and within a company's portion of the building. While all of the various location information for a beacon is known by the location engine, the privacy engine is used to determine what location information is provided to an application.

At 820, first privacy data associated with the first beacon identifier is determined. In an example, the first beacon identifier is used to determine an object identifier. The object identifier may be used to retrieve the first privacy data. The privacy data is data that is used by the privacy engine to determine if an application should learn about a detected beacon being proximate to the application. Some portions of the privacy data may be specific to the object associated with the first beacon identifier. For example, the first beacon identifier may be associated with an individual. This individual may have selected to be private from the hours of midnight through 8 am to all non-family members. In addition, the individual may have selected to be private when located within a spa that is in the defined space. The privacy data may also include global settings, such as all objects are private when located within a bathroom. Spaces within the defined space may also have privacy settings. For example, a doctor's office may be marked private during normal business hours but public when the office is closed since there should not be individuals in the office during those times. As another example, a religious area may be marked private during events.

In some embodiments, a location within the physical construct of the beacon associated with the first beacon identifier is determined. The location may be used by the privacy engine to determine if the first beacon identifier should be filtered. As described above, the location may be a two-dimensional or three-dimensional coordinate. The location may also be used to determine an area within the physical construct. The area may then be used to determine an area-specific privacy setting. For example, a bathroom may have an area-specific privacy setting. The privacy data may include the area and the area-specific privacy setting. In another example, the privacy data may include an area-time privacy setting based on the area. For example, a public dining area may be public during opening hours and private during closed hours. Time settings may also include dates, date ranges, time ranges, etc. To determine the location, the privacy engine may access a location service. In various examples, the location may be considered part of the privacy data.

At 830, the first beacon identifier is determined to be filtered based on the first privacy data. For example, the first beacon identifier may be identified as an untrackable identifier via the privacy data. The privacy data may also indicate the first beacon identifier is private based on the time of day, the location of the beacon within the physical construct, etc. In some examples, a privacy engine is making the decision to filter the beacon identifier. As an example, a device may run an application. The device may also detect a beacon that is proximate to the device. A privacy layer, which may also include a local privacy engine, determines if the detected beacon identifier should be filtered. If filtered, the privacy layer does not pass the detected beacon identifier to the application. In this example, the application is unaware that the beacon was even detected. In some examples, the privacy layer provides the detected beacon identifier to a remote privacy engine that provides a result of the filter determination. In some examples, the device may not be able to connect to the privacy engine. For example, the device may have lost its data connection to a network used to access the privacy engine.

When the device does not have a data connection, the privacy layer may still operate to filter detected beacons using a local privacy engine. In this example, the local privacy engine may filter all detected beacons. In another example, privacy data is stored locally on the device, such that the local privacy engine is able to make the filter determination based on the privacy data. In this example, the device may utilize the local privacy data even when there is a data connection. In another example, only a portion of all of the privacy data is stored locally. For example, the device may store all of the global private areas, but not store object specific privacy data.

At 840, the privacy engine, either remote or local, provides an indication to filter the first beacon identifier. A privacy layer on the device filters the first beacon identifier based on the indication.

At 850, a second beacon identifier is received. In an example, the second beacon identifier may be associated with a different object that has different privacy data. At 860, second privacy data associated with the second beacon identifier is determined. At 870, the second beacon identifier is determined to not be filtered based on the privacy data. At 880, an indication to not filter the second beacon identifier is provided. The second beacon identifier may be provided to an application, which may then use the second beacon identifier to access additional information associated with the second beacon identifier. For example, the beacon identifier may be used to determine what applications should be woken up and provided with the beacon identifier.

In an example, the first beacon identifier and the second beacon identifier may be associated with different objects. For example, the first beacon identifier may be associated with a guest and the second beacon identifier associated with a crew member. The guest may be associated with privacy data that indicates the guest should be private after 10 pm; anytime they are in their assigned room; and anytime the guest is in a casino. The crew member may have a privacy setting only for their assigned room. In an example, both the guest and the crew member may be in a casino at the same time. In this example, the privacy engine would filter the beacon identifier associated with the guest and not filter the beacon identifier associated with the crew member. As another example, the first and second beacon identifiers may be associated with the same object. In this example, the first beacon may be filtered when the beacon identifier is detected after 10 pm, while the second beacon is not filtered when the beacon identifier is detected at 10 am.

As another example, privacy data may include an application identifier that would like to access the detected beacon. Filtering or not filtering the detected beacon may be based on the application identifier. The application identifier may be an indication that the application is a safety application. For example, a locator application may be used by safety person during an evacuation of the defined space. In this example, the application identifier may be used to override other privacy data to ensure the application learns that a proximate beacon was detected. In some examples, a privacy layer on device may check the application identifier before requesting a filter determination from a remote privacy engine.

As described above, the privacy engine is able to use areas, such as bathrooms, cabins, restaurants, casinos, etc., that are defined within the physical construct. The privacy engine, however, is also able to operate outside of the defined area that is mapped in the physical construct. FIG. 6 provides an example of this. In an example, a device may determine that a location service, such as a location engine associated with the physical construct, is unavailable. To determine the location service is unavailable, the device may search for a wireless network connection from a known wireless network. If the known wireless network is unavailable, the device may then determine if a positioning systems, such as GPS, is available. If the positioning system is available and the known wireless network is not reachable, the known location service may be determined to be unavailable.

In FIG. 6, the physical construct may be associated with the cruise ship 610. Guest may disembark from the cruise ship 610 and travel along the beach 612. The known wireless network may be the wireless network of the cruise ship 610. In this example, there is no physical construct associated with the beach 612, the restrooms 620 and 630, or the building 640. The device may determine a current location of the device using GPS or some other positioning service. The device may then determine if the device is located within a private area, such as a privacy halo, such as 622, 632, or 642, or a private area defined by boundaries. The data that defines the private areas may be received by the device from the known wireless network. In another example, the private areas may be retrieved from a remote server via another network. For example, during configuration the device may access a configuration server via any network connection. Access controls on the configuration server or as part of the configuration server's network may be used to control access to the configuration information.

If the device is within any private area, then all detected beacons are filtered. This means that when the device is within a private area, applications will not be notified when beacon identifiers are detected. Importantly, privacy in this example is based on the location of the device that is running an application. Privacy of location data in FIG. 4 may be based on the location of the detected beacon rather than the device running an application. Although private areas for devices running an application may also be defined within the physical construct, which would result in filtering all detected beacons when the device is located within a private area.

Figure 9:
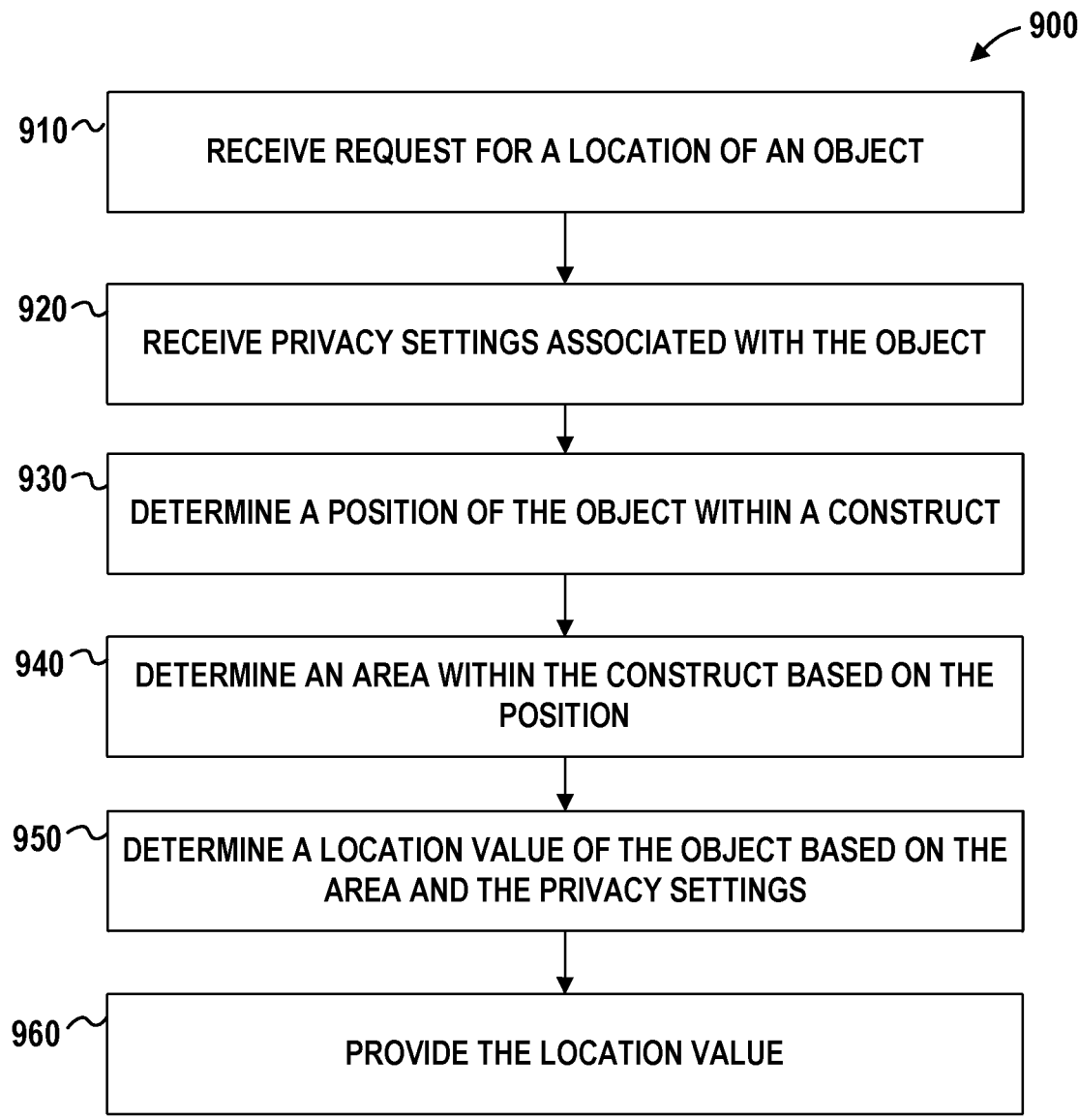
FIG. 9 is a flow diagram of a process for providing location data protection in accordance with respective examples.

FIG. 9 is a flow diagram of a process 900 for providing location data protection in accordance with respective examples. The process 900 may be executed on a computing device. The process 900 may be used by an application to request the location of an object. The device running the application and the requested object do no need to be near one another. For example, a Find-A-Person application may be used to request location of a specific person, regardless of how proximate the person is to the device running the application.

At 910, a request for a location of an object is received. For example, the request may be received by an application. The application may provide the request or an additional request based on the request to a privacy engine. The object may be located within a defined space that is mapped into a physical construct. The location provided may indicate where in the physical construct the object is located. The location provided may be, for example, a coordinate of the object within the construct, an area where the object is located, unknown, or private. A privacy engine may determine what specific location is provided based on privacy settings. In some examples, multiple location items are returned. For example, the object's coordinate and area may both be provided. In some examples, a time stamp is also returned. The time stamp may indicate the last time the object was detected at the provided location.

At 920, privacy settings associated with the object are retrieved. In an example, the request for privacy settings includes an object identifier that is used to retrieve the privacy settings associated with the object. The privacy settings may be stored in the privacy engine or in a data store accessible by the privacy engine. The privacy settings may be specific to the object. For example, the object may be an individual who has specific privacy settings. The individual may have elected to not be located during specific time periods, such as between 6 am to 8 am and from midnight to 5 am. In addition, the privacy settings may indicate certain areas where the individual's location should be unknown or private. For example, the individual's cabin, a spa, a pool, etc., may all be indicated as private areas for this specific individual. There may also be global privacy settings, such as bathrooms, etc., that are private by default for a large number of objects.

Privacy settings may also be grouped for multiple individuals. For example, each member of a family may have the same initial privacy settings, which may then be modified by each individual. The privacy settings may also indicate applications or requesters that may learn the location of an object, even if the object would have otherwise been private. For example, a parent may be allowed to learn their child's location at anytime, even if a child's friend would be restricted. As an example, the privacy settings for a child are set to private anytime after 9 pm, which the exception that the child's parents may know the child's location at anytime. At 7 pm, both a friend of the child and the parent's of the child may use an application to learn the location of the child. At 9:05 pm, the friend of the child would no longer be granted access to the location via the privacy engine, while the parents would still be able to retrieve the child's location. Privacy settings may also be based on a date, date range, time range, etc. In another example, privacy settings may be based on an age of the person associated with the object. For example, any individual under the age of 18 may not allow the location of that individual to be known to anyone other than family members or specific personnel, such as security personnel.

The privacy settings may also be contextual. For example, an individual may be located in a restaurant. Another individual is sitting at the same table or nearby. The location of the second individual may be private but also marked as knowable if near an allowed individual. In this example, the second individual's location may be returned as near the initial individual. This feature allows a whose-nearby function to work correctly. In some examples, the second individual's privacy setting would indicate the second individual is private and would not show up as near the initial individual. The opposite scenario is also possible, where an individual is marked private and also indicates that anyone near them should also be private. This setting may also be based on time and area. For example, an individual could indicate that within their own room they are private as well as anyone else that is also in the room.

Conflicts in privacy settings may be resolved based on the area, individual, requester, etc. For example, a first person is being visited by a second person in the first person's room. The first person's privacy setting may indicate that this room is private and anyone else in the room should also be private. The second person's privacy setting may indicate the location of the second person is public. In this example, there is a conflict regarding the location of the second person. In an example, the location of the individuals are used to determine which privacy setting should apply. For example, the privacy setting of the room may be used rather than the second individual's privacy setting. In another example, the room is assigned to the first person, so the first person's privacy settings may be used. In yet another example, a parent of the second individual may request the location. Because the parent is requesting the location, the privacy settings of the parent or of the second individual may be used to return the location of the second individual.

As another example of contextual privacy settings, a daycare center may be marked private. While a child is at the daycare center, a parent would be able to access the child's location even though the daycare center is in a private area. Other individuals, who do not have a child currently at the daycare center, would not be able to learn the location of any children at the daycare center.

At 930, a position of the object within a construct of a physical space is determined. The position may be determined by retrieving the position from a location engine. The location engine may determine the position of the object based on multiple readers detecting a beacon associated with the object. The position may be a 2-D or 3-D coordinate within the physical construct.

At 940, an area within the construct of the physical space based on the position is determined. The area may be determined by retrieving the area from the location engine. The location engine may use the physical construct and the position of the object to determine an area within the physical construct where the object is located. Area specific privacy settings may be retrieved based on the determined area. Non-limiting examples of areas include a specific room, a specific restaurant, a lobby area, a specific pool, etc.

At 950, a location value of the object based on the area and the privacy settings is determined. The location value may be a coordinate of the object within the physical construct. In another example, the location value may be a room that is defined within the physical construct. To provide some indication of a location, while maintaining some privacy, the location value may be a floor of a building defined by the physical construct. In another example, the location value may be an indication of aft, starboard, port, forward, etc. section of a ship. The location value may also be a combination of these values. For example, the location value may indicate an object is on the fourth floor starboard. The privacy setting may indicate that the requester is only to know of the object's general location. In this example, a more abstract location, such as a floor value rather than an area within the floor, may be the location value.

At 960, the location value is provided in response to the request. The location value may be provided to the application. The application may provide the location value directly via a user interface. In another example, a portion of the physical construct is visible represented with a marker indicating the location value.

Figure 10:
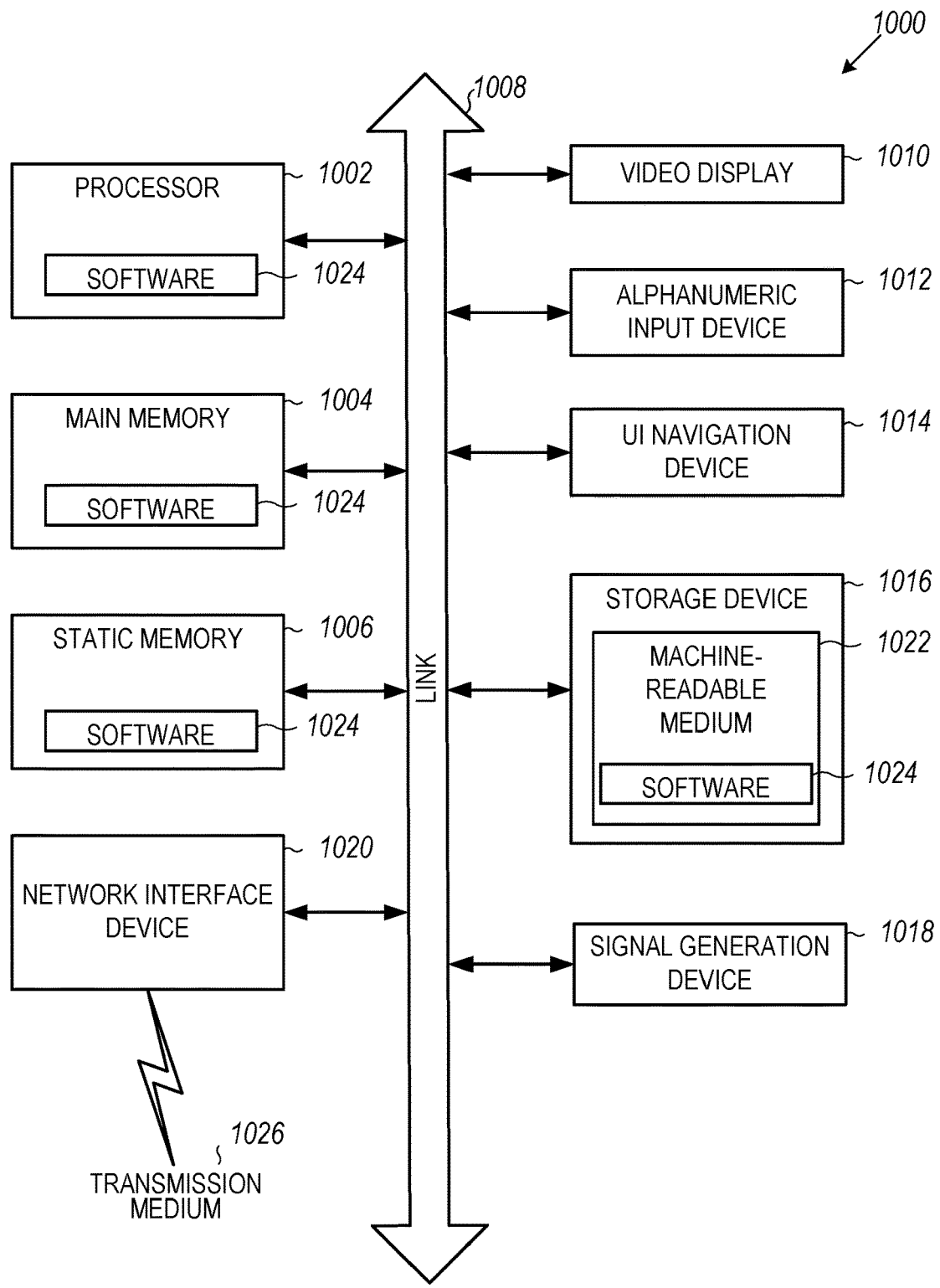
FIG. 10 is an example computing device that can be used in conjunction with the technologies described herein.

FIG. 10 is an example computing device that can be used in conjunction with the technologies described herein. In alternative embodiments, the computing device 1000 may operate as a standalone device or may be connected (e.g., networked) to other computing devices. In a networked deployment, the computing device 1000 may operate in the capacity of a server communication device, a client communication device, or both in server-client network environments. In an example, the computing device 1000 may act as a peer computing device in peer-to-peer (P2P) (or other distributed) network environment. The computing device 1000 may be a personal computer (PC), a tablet PC, a set top box (STB), a personal digital assistant (PDA), a mobile telephone, a smart phone, a web appliance, a network router, switch or bridge, or any computing device capable of executing instructions (sequential or otherwise) that specify actions to be taken by that computing device. Further, while only a single computing device is illustrated, the term "computing device" shall also be taken to include any collection of computing devices that individually or jointly execute a set (or multiple sets) of instructions to perform any one or more of the methodologies discussed herein, such as cloud computing, software as a service (SaaS), other computer cluster configurations. Computing device may be an implementation of device 500, may implement the privacy engine, may implement the location engine, perform the method of FIG. 8, and perform the method of FIG. 9.

Computing device 1000 may include a hardware processor 1002 (e.g., a central processing unit (CPU), a graphics processing unit (GPU), a hardware processor core, or any combination thereof), a main memory 1004 and a static memory 1006, some or all of which may communicate with each other via a link (e.g., bus) 1008. The computing device 1000 may further include a display unit 1010, an input device 1012 (e.g., a keyboard), and a user interface (UI) navigation device 1014 (e.g., a mouse). In an example, the display unit 1010, input device 1012, and UI navigation device 1014 may be a touch screen display. In an example, the input device 1012 may include a touchscreen, a microphone, a camera (e.g., a panoramic or high-resolution camera), physical keyboard, trackball, or other input devices.

The computing device 1000 may additionally include a storage device (e.g., drive unit) 1016, a signal generation device 1018 (e.g., a speaker, a projection device, or any other type of information output device), a network interface device 1020, and one or more sensors, such as a global positioning system (GPS) sensor, compass, accelerometer, motion detector, or other sensor. The computing device 1000 may include an input/output controller 1028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.) via one or more input/output ports.

The storage device 1016 may include a computing-readable (or machine-readable) storage media 1022, on which is stored one or more sets of data structures or instructions 1024 (e.g., software) embodying or utilized by any one or more of the techniques or functions described herein. In an example, at least a portion of the software may include an operating system and/or one or more applications (or apps) implementing one or more of the functionalities described herein. The instructions 1024 may also reside, completely or at least partially, within the main memory 1004, within the static memory 1006, and/or within the hardware processor 1002 during execution thereof by the computing device 1000. In an example, one or any combination of the hardware processor 1002, the main memory 1004, the static memory 1006, or the storage device 1016 may constitute computing device (or machine) readable media.

While the computer-readable storage media 1022 is illustrated as a single medium, a "computer-readable storage media" or "machine-readable storage media" may include a single medium or multiple media (e.g., a centralized or distributed database, and/or associated caches and servers) configured to store the one or more instructions 1024.

In an example, a computer-readable storage media or machine-readable storage media may include any medium that is capable of storing, encoding, or carrying instructions for execution by the computing device 1000 and that cause the computing device 1000 to perform any one or more of the techniques of the present disclosure, or that is capable of storing, encoding or carrying data structures used by or associated with such instructions. Non-limiting computer-readable storage media examples may include solid-state memories, and optical and magnetic media. Specific examples of computer-readable storage media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and optical media disks. The computer-readable storage media is non-transitory in that the storage media does not consist of transitory propagating signals.

The instructions 1024 may further be transmitted or received over a communications network 1026 using a transmission medium via the network interface device 1020 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. The network interface device 1020 may use the transfer protocols to transmit data using transitory propagating signals.

In an example, the network interface device 1020 may include one or more physical jacks (e.g., Ethernet, coaxial, or phone jacks) or one or more antennas to connect to the communications network 1026. In an example, the network interface device 1020 may include one or more wireless modems, such as a Bluetooth modem, a Wi-Fi modem or one or more modems or transceivers operating under any of the communication standards mentioned herein. In an example, the network interface device 1020 may include a plurality of antennas to wirelessly communicate using at least one of single-input multiple-output (SIMO), multiple-input multiple-output (MIMO), or multiple-input single-output (MISO) techniques. In some examples, the network interface device 1020 may wirelessly communicate using Multiple User MIMO techniques. In an example, a transmission medium may include any intangible medium that is capable of storing, encoding or carrying instructions for execution by the computing device 1000, and includes digital or analog communications signals or like communication media to facilitate communication of such software.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

The above description is intended to be illustrative, and not restrictive. For example, the above-described examples (or one or more aspects thereof) may be used in combination with others. Other embodiments may be used, such as by one of ordinary skill in the art upon reviewing the above description. Further, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A method comprising operations performed using an electronic processor, the operations comprising:
   receiving a first beacon identifier associated with a first object;
   determining first privacy data associated with the first beacon identifier;
   sending, to a location service remote from the electronic processor, a request for a position within a construct of physical space of the first object based on receiving the first beacon identifier, wherein the request comprises the first beacon identifier;
   receiving, in response to the request for the position of the first object, an area within the construct of physical space based on the position of the first object;
   determining the area within the construct of physical space is a private space based on the first privacy data;
   determining to filter the first beacon identifier based on the determining the area within the construct of physical space is the private space;
   providing an indication to filter the first beacon identifier;
   receiving a second beacon identifier associated with a second object;
   determining second privacy data associated with the second beacon identifier;
   determining to not filter the second beacon identifier based on the second privacy data; and
   providing an indication to not filter the second beacon identifier.

2. The method of claim 1, further comprising determining the position of the first object within the construct of the physical space, wherein the first privacy data comprises the position of the first object.

3. The method of claim 2, wherein the position of the first object is an x,y,z coordinate within the construct of the physical space.

4. The method of claim 2, further comprising:
   determining the area within the construct of the physical space based on the position; and
   determining an area privacy setting based on the area, wherein the first privacy data comprises the area and the area privacy setting.

5. The method of claim 4, further comprising determining an area-time privacy setting based on the first beacon identifier, wherein the first privacy data comprises the area-time privacy setting.

6. The method of claim 1, further comprising mapping the first beacon identifier to a person identifier.

7. The method of claim 6, further comprising determining a person-time privacy setting based on the person identifier, wherein the first privacy data comprises the person-time privacy setting.

8. The method of claim 6, further comprising determining an age privacy setting based on the person identifier, wherein the first privacy data comprises the age privacy setting.

9. The method of claim 6, wherein the determining first privacy data associated with the first beacon identifier comprises using the person identifier.

10. The method of claim 1, further comprising providing the second beacon identifier to an application based on the determining to not filter the second beacon identifier.

11. The method of claim 1, further comprising:
    determining the location service is unavailable;
    determining, using a second, different location service, a current position of a device that houses the electronic processor;
    determining the current position is within a privacy halo; and
    filtering all received beacon identifiers based on the determining the current position is within a privacy halo.

12. The method of claim 10, wherein the determining the location service is unavailable comprises:
    searching for a wireless network connection from a known wireless network; and
    determining the second, different location service is available.

13. The method of claim 12, further comprising receiving privacy halo information, wherein the privacy halo information indicates the privacy halo.

14. The method of claim 13, wherein the privacy halo information is received from the known wireless network.

15. The method of claim 1, wherein the second privacy data comprises a safety application indication, and wherein the determining to not filter the second beacon identifier is based on the safety application indication.

16. A system comprising:
    an electronic processor configured to:
       receive a first beacon identifier associated with a first object;
       determine first privacy data associated with the first beacon identifier;
       send, to a location service remote from the electronic processor, a request for a position within a construct of physical space of the first object based on receiving the first beacon identifier, wherein the request comprises the first beacon identifier;
       receive, in response to the request for the position of the first object, an area within the construct of physical space based on the position of the first object;
       determine the area within the construct of physical space is a private space based on the first privacy data;
       determine to filter the first beacon identifier based on the determination that the area within the construct of physical space is the private space;
       provide an indication to filter the first beacon identifier;
       receive a second beacon identifier associated with a second object;
       determine second privacy data associated with the second beacon identifier;
       determine to not filter the second beacon identifier based on the second privacy data; and
       provide an indication to not filter the second beacon identifier.

17. The system of 16, further comprising an application configured to receive the second beacon identifier, wherein the first beacon identifier is not received by the application.

18. The system of claim 16, wherein the electronic processor is further configured to determine the position of the first object within the construct of the physical space, wherein the first privacy data comprises the position of the first object.

19. A non-transitory computer-readable storage medium storing computer-executable instructions, the stored instructions comprising:
    instructions to receive a first beacon identifier associated with a first object;
    instructions to determine first privacy data associated with the first beacon identifier;
    instructions to send, to a location service remote from the electronic processor, a request for a position within a construct of physical space of the first object based on receiving the first beacon identifier, wherein the request comprises the first beacon identifier;
    instructions to receive, in response to the request for the position of the first object, an area within the construct of physical space based on the position of the first object;
    instructions to determine the area within the construct of physical space is a private space based on the first privacy data;
    instructions to determine to filter the first beacon identifier based on the determination that the area within the construct of physical space is the private space;
    instructions to provide an indication to filter the first beacon identifier;
    instructions to receive a second beacon identifier associated with a second object;
    instructions to determine second privacy data associated with the second beacon identifier;
    instructions to determine to not filter the second beacon identifier based on the second privacy data; and
    instructions to provide an indication to not filter the second beacon identifier.

20. The non-transitory computer-readable storage medium of claim 19, wherein the instructions further comprise instructions to determine the position of the first object within the construct of the physical space, wherein the first privacy data comprises the position of the first object.

* * * * *